United States Patent [19]

Shintani et al.

[11] Patent Number: 5,444,221
[45] Date of Patent: Aug. 22, 1995

[54] HIGH-FREQUENCY INDUCTION HEATING APPARATUS FOR ROCKER ARMS

[75] Inventors: Ryoei Shintani; Yoshihide Fuziwara; Shozo Kawana; Haruo Tanaka, all of Wako; Daiji Ito, Hiratsuka, all of Japan

[73] Assignee: Honda Giken Kogyo Kabushiki Kaisha, Tokyo, Japan

[21] Appl. No.: 176,230

[22] Filed: Jan. 3, 1994

[30] Foreign Application Priority Data

Mar. 31, 1993 [JP] Japan .................. 5-074192

[51] Int. Cl.⁶ ........................... H05B 6/14
[52] U.S. Cl. .................. 219/635; 219/639; 219/651; 219/656; 219/615; 148/567; 148/574; 266/129
[58] Field of Search ............... 219/615, 610, 651, 656, 219/639, 632, 635; 148/567, 569, 572, 574; 266/127, 129

[56] References Cited

U.S. PATENT DOCUMENTS

| | | | |
|---|---|---|---|
| 2,673,276 | 3/1954 | Allardt | 219/610 |
| 3,715,556 | 2/1973 | Balzer et al. | 219/646 |
| 3,806,690 | 4/1974 | Frungel | 219/651 |
| 4,319,707 | 3/1982 | Knemeyer | 219/615 |
| 4,745,252 | 5/1988 | Roth et al. | 219/656 |
| 4,902,358 | 2/1990 | Napier et al. | 148/528 |
| 4,969,957 | 11/1990 | Ohsaki et al. | 148/547 |
| 5,158,227 | 10/1992 | Esson | 219/610 |

FOREIGN PATENT DOCUMENTS 340084  9/1993  Japan .

*Primary Examiner*—Philip H. Leung

[57] ABSTRACT

Disclosed is a high-frequency heating apparatus including an elongated chamber in which a plurality of rocker arms are introduced, each of the rocker arms being attached with a chip and brazing filler such as a copper wax, a high-frequency brazing coil for high-frequency heating a designated part of each rocker arm in the chamber to braze the chip to the rocker arm, a high-frequency temperature-holding coil for holding the temperature of the rocker arm constant, and a nitrogen gas supplying device for keeping the chamber filled with a nitrogenous atmosphere during the high-frequency heating.

6 Claims, 3 Drawing Sheets

HIGH-FREQUENCY INDUCTION HEATING APPARATUS FOR ROCKER ARMS

BACKGROUND OF THE INVENTION

1. Field of the invention

This invention relates to a method of and an apparatus for high-frequency heating of a rocker arm to braze a chip thereto.

2. Description of the Related Art

It is a normal practice to use a heating furnace to braze a chip to a rocker arm which is one of the parts constituting an internal combustion engine. In the heating furnace using electric heat, gas, or heavy oil as energy source, a heavily excess heat is consumed as compared to the heat required to heat a part of the rocker arm. As a result, entire manufacturing equipment becomes large in size, expensive in cost and complex in structure associated with awkward maintenance requirements.

As disclosed in Japanese Patent Publication No. 3-40084, there is known a method wherein a designated part of the rocker arm to which a chip is attached is high-frequency heated and then air-cooled to thereby braze the chip to the rocker arm with a reduced energy consumption.

In the above conventional method, however, the high-frequency heating is carried out in the normal atmosphere of a workshop, resulting in an oxide film developed in particular on the surface of the ferrous chip. A problem has been therefore pointed out that the above conventional method requires an additional process of removing the oxide film from the chip after the high-frequency heating, making the entire process of chip brazing inefficient.

SUMMARY OF THE INVENTION

The present invention has been made to solve the above problem. It is therefore an object of the present invention to provide a method of and an apparatus for carrying out high-frequency heating, which are capable of reliably preventing the chips and rocker arms from being oxidized during the high-frequency heating, and realizing an efficient chip brazing process.

According to one aspect of this invention, for achieving the above object, there is provided a method of high-frequency heating comprising steps of: placing a plurality of rocker arms in a chamber, each of the rocker arms having a chip and brazing filler attached thereto; keeping the chamber filled with a nitrogenous atmosphere; high-frequency heating each of the rocker arms at a designated part thereof for a predetermined time; and cooling the rocker arms with cooling nitrogen gas introduced into the chamber after the high-frequency heating treatment.

According to another aspect of the invention, there is provided an apparatus for high-frequency heating comprising: a chamber for introducing therein a plurality of rocker arms, each of the rocker arms having the chip and brazing filler attached to a designated part thereof; a high-frequency brazing coil for high-frequency heating each of the rocker arms at the designated part thereof to braze the chip thereto with the brazing filler; a high-frequency temperature-holding coil for keeping the temperature of said designated part after the high-frequency heating; and nitrogen gas supplying means for keeping the chamber filled with a nitrogenous atmosphere during the high-frequency heating.

The above-stated apparatus may further comprise conveyor means for successively introducing each of the rocker arms into the chamber and discharging the rocker arm from the chamber after the high-frequency heating, and means for supplying cooling nitrogen gas to cool the rocker arms after the high-frequency heating.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENT

A method of and an apparatus for high-frequency heating according to the present invention will hereinafter be described in detail with reference to the accompanying drawings in which a preferred embodiment is shown by way of illustrative example.

Figure 1:
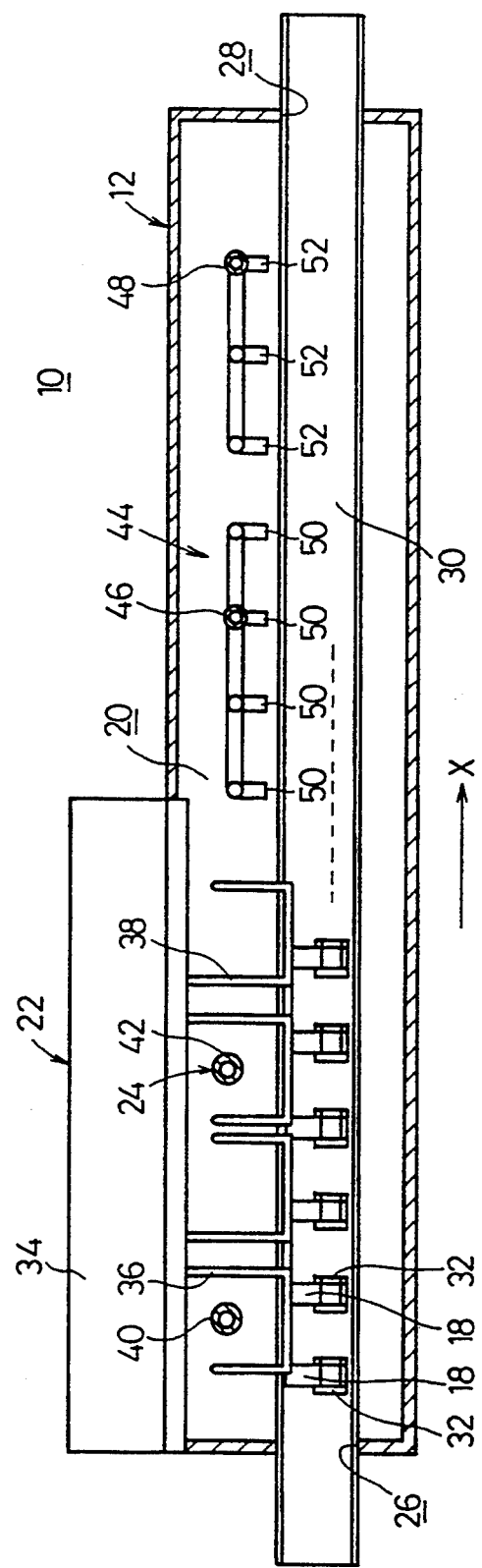
FIG. 1 is a plan view showing the inside of a high-frequency heating apparatus according to one embodiment of the present invention.
Figure 2:
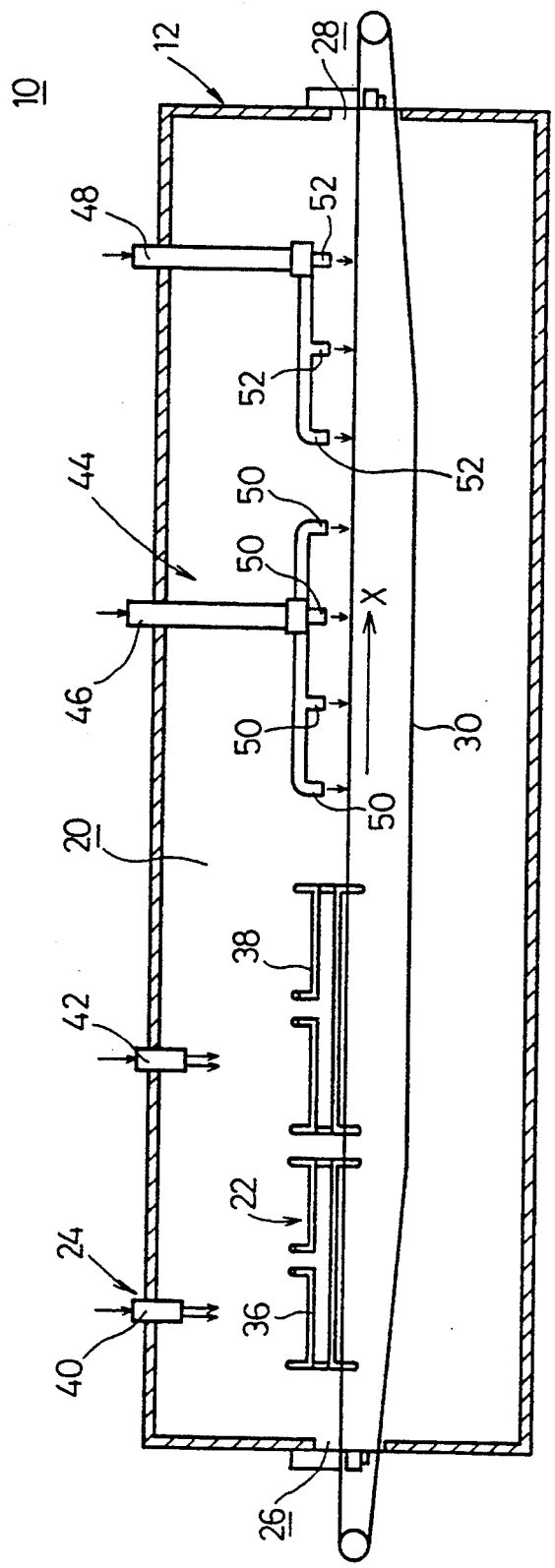
FIG. 2 is a side view illustrating the inside of the high-frequency heating apparatus shown in FIG. 1.
Figure 3:
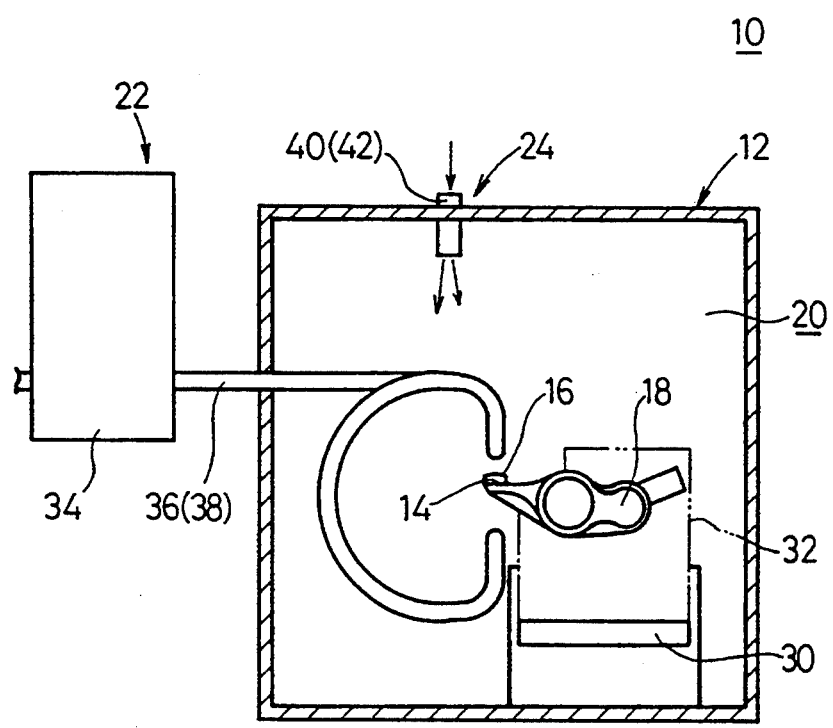
FIG. 3 is a vertical sectional front view showing the high-frequency heating apparatus shown in FIG. 1.

In FIGS. 1 through 3, reference numeral 10 indicates a high-frequency heating apparatus according to the present embodiment. The high-frequency heating apparatus 10 comprises a chamber 20 which is formed within a casing 12 elongated in the direction indicated by an arrow X (ie., a feeding direction) and in which a plurality of rocker arms 18 (see FIG. 3) are placed, each having a chip 16 and brazing filler 14 such as copper wax attached thereto, a high-frequency power generating means 22 for high-frequency heating a designated part of each rocker arm 18 in the chamber 20 to thereby braze the chip 16 to the rocker arm 18 with the brazing filler 14, and a nitrogen gas supplying means 24 for keeping the chamber 20 filled with a nitrogenous atmosphere during heating of the rocker arms 18 by the high-frequency heating means 22.

There are provided an inlet 26 and an outlet 28 both formed at both ends of the casing 12, and a conveyor (conveyor means) 30 which is used to successively introduce the rocker arms 18 into the chamber 20 through the inlet 26 in the direction indicated by the arrow X, and to take out or discharge the high-frequency heated rocker arms 18 through the outlet 28. The conveyor 30 travels endlessly in the X direction, by an unillustrated rotative drive source and is provided with a plurality of jigs 32 fixed thereto at predetermined intervals for mounting the rocker-arms.

The high-frequency power generating means 22 has a high-frequency power source 34 disposed on one side of the casing 12 and on the upstream side as seen in the X direction. A high-frequency brazing coil 36 and a high-frequency temperature-holding coil 38 connected to the high-frequency power source 34 are disposed within the chamber 20. As shown in FIG. 3, in the chamber 20, the high-frequency brazing coil 36 is placed so as to place the designated part of the rocker arm 18, to which the chip 16 is brazed, between turns of the coil each extending in the X direction for a predetermined length. The high-frequency temperature-holding coil 38 placed on the downstream side of the high-frequency brazing coil 36 has a construction identical to that of the high-frequency brazing coil 36.

The nitrogen gas supplying means 24 has nitrogen-gas injection pipes 40 and 42 fixed to an upper portion of the casing 12 corresponding to the locations of the high-frequency brazing coil 36 and the high-frequency temperature-holding coil 38, respectively. The nitrogen-gas injection pipes 40 and 42 are connected to an unillustrated nitrogen gas supply source and serve to maintain the atmosphere surrounding the high frequency coils 36 and 38 nitrogenous.

A cooling nitrogen-gas supplying means 44 disposed on the downstream side of the high-frequency temperature-holding coil 38 and used for cooling the rocker arms 18 which have been high-frequency heated, is provided in the chamber 20. The cooling nitrogen-gas supplying means 44 has nitrogen-gas injection pipes 46 and 48 which are coupled to the unillustrated nitrogen gas supply source and respectively communicate with a plurality of cooling nozzles 50 and 52. The cooling nozzles 50 and 52 are directed to the high-frequency heat treated part of each of the rocker arms 18 conveyed in the direction indicated by the arrow X along the conveyor 30.

Operation of the high-frequency heating apparatus 10 constructed as described above will now be described below in connection with the high-frequency heating method according to the present embodiment.

The rocker arms 18 each having the chip 16 and the brazing filler 14 attached thereto are first mounted on their corresponding jigs 32 of the conveyor 30 and the conveyor 30 then runs in the direction indicated by the arrow X, ie., in the feeding direction. Therefore, the rocker arms 18 on the jigs 32 are successively introduced into the chamber 20 through the inlet 26 of the casing 12.

High-frequency current flows in the high-frequency brazing coil 36 and high-frequency temperature-holding coil 38 from the high-frequency power source 34 of the high-frequency power generating means 22. The frequency is selected in a range from 50 to 300 kHz, preferably, from 100 to 200 kHz. At the same time, the nitrogen gas is supplied to the chamber 20 through the nitrogen-gas injection pipes 40 and 42 to keep the atmosphere surrounding the high frequency coils 36 and 38 nitrogenous.

Thus, the designated part of each rocker arm 18 to which the chip 16 is brazed, is placed between the mutually parallel-extending turns of the high-frequency brazing coil 36 (see FIG. 3) and conveyed in the X direction. Accordingly, the designated part of the rocker arm 18 is subjected to the high-frequency heating so that the brazing filler 14 is molten to braze the chip 16 to the rocker arm 18.

Here, the high-frequency brazing coil 36, and similarly the high-frequency temperature-holding coil 38, too, has a predetermined length in the X direction. Therefore, when the rocker arms 18 are conveyed in the X direction by the conveyor 30, they are heated for the predetermined time by the high-frequency brazing coil 36, and their temperature is held constant by the high-frequency temperature-holding coils 38 for the same time period..

If the brazing is carried out by the high-frequency heating alone without the temperature holding process, the brazing filler 14 cannot be sufficiently diffused into the chip 16 and rocker arm 18. As a result, the chip 16 cannot be firmly brazed to the rocker arm 18 and is easily separable from the rocker arm 18. In the present embodiment, on the contrary, the designated part of the rocker arm 18 is heated and its temperature is held for the predetermined time (e.g., 10 to 30 seconds) so as to sufficiently diffuse the brazing filler 14 into the chip 16 and the rocker arm 18, to thereby make it possible to prevent a peeling strength from being reduced. This has been demonstrated from experimental results shown in Table 1, with a pure copper wax and a brass wax as the brazing filler 14.

TABLE 1

| Sample No. | Brazing material | Flux | Holding time | Peeling load | State of diffusion | Temperature | Evaluation |
|---|---|---|---|---|---|---|---|
| 1 |  |  | 10 sec. | 836 kg | less | 1070° C. | ○ |
| 2 | copper | No | 20 sec. | 814 kg | Yes |  | ⊚ |
| 3 |  |  | 30 sec. | 621 kg | Yes |  | ⊚ |
| 4 |  |  | 10 sec. | 621 kg | less |  | ○ |
| 5 | copper | Yes | 20 sec. | 688 kg | Yes |  | ⊚ |
| 6 |  |  | 30 sec. | 753 kg | Yes | 1090° C. | ⊚ |
| 7 |  |  | 10 sec. | 333 kg |  | 940° C. | X |
| 8 | brass | No | 20 sec. | 290 kg | No |  | X |
| 9 |  |  | 30 sec. | 352 kg |  |  | X |
| 10 |  |  | 10 sec. | 650 kg |  |  | ○ |
| 11 | brass | Yes | 20 sec. | 665 kg | No |  | ○ |
| 12 |  |  | 30 sec. | 705 kg |  | 960° C. | ○ |

Under the condition in which the pure copper wax is used as the brazing filler 14 without a flux as shown in Table 1, the state of diffusion of the brazing filler 14 into the chip 16 was obtained as satisfactory when the temperature-holding time was 30 seconds (see Sample No. 6).

In the present embodiment, the atmosphere surrounding the high-frequency brazing coil 36 and the high-frequency temperature-holding coil 38 is kept nitrogenous when the designated part of the rocker arm 18 is heated and kept at its temperature for the predetermined time. It is therefore possible to reliably prevent an oxide film from being formed on the chip 16 and the rocker arm 18. It is also unnecessary to carry out an oxide-films removing process after the brazing. Thus, the efficiency of the overall brazing process can be enhanced effectively.

After passing through the high-frequency brazing coil 36 and the high-frequency temperature-holding coil 38, the rocker arms 18 are fed in the X direction and placed at the locations to which the cooling nitrogen gas is supplied via the nitrogen-gas injection pipes 46 and 48 of the cooling nitrogen-gas supplying means 44. The nitrogen gas is injected via the plurality of cooling nozzles 50 and 52 to the high-frequency heat treated part of each rocker arm 18 while conveyed in the X direction by the conveyor 30, so that the rocker arm 18 is cooled in the nitrogenous atmosphere. As a result, the rocker arm 18 and chip 16 can be annealed without being oxidized, thereby preventing the occurrence of a crack or the like.

Thus, according to the present invention, the plurality of rocker arms 18 can be successively introduced into the apparatus 10 by the conveyor 30, subjected to the high-frequency heating treatment to be efficiently brazed, and successively discharged from the apparatus 10.

Having now fully described the invention, it will be apparent to those skilled in the art that many changes and modifications can be made without departing from the spirit or scope of the invention as set forth herein.

What is claimed is:

1. A high frequency induction heating apparatus for rocker arms, comprising:
    a chamber for introducing therein a plurality of rocker arms, each of said rocker arms having a chip and brazing filler attached to a designated part thereof;
    means for transferring said rocker arms into said chamber for processing thereof;
    a high-frequency brazing coil provided in an upperstream location within said chamber for high-frequency heating each of said rocker arms at said designated part thereof to braze said chip thereto with said brazing filler;
    a high-frequency temperature-holding coil for holding the temperature of said designated part after high-frequency heating;
    a first means for supplying gas for preventing said rocker arm from oxidizing, provided at a location corresponding to said high-frequency brazing coil;
    a second means for supplying gas for cooling said rocker arms, provided in a downstream location within said chamber; and
    jig means provided on said transfer means for holding said rocker arms in a given attitude with respect to said high-frequency brazing coil.

2. The apparatus according to claim 1, wherein said gas supplied from said first and second gas supply means is nitrogen gas.

3. The apparatus according to claim 1, wherein said second gas supply means include a plurality of nozzles which supply nitrogen gas directly to said rocker arms.

4. The apparatus according to claim 1, wherein said high-frequency brazing coil and said high-frequency temperature-holding coil each extend in a direction of travel of said means for transferring.

5. The apparatus according to claim 4, wherein said high-frequency brazing coil and said high-frequency temperature-holding coil each extend on two opposing sides of said designated part of said rocker arms.

6. The apparatus according to claims 1, wherein said second gas supply means include a plurality of nozzles which supply nitrogen gas directly to the rocker arms at a plurality of locations along a direction of travel of said means for transferring.

* * * * *